UNITED STATES PATENT OFFICE.

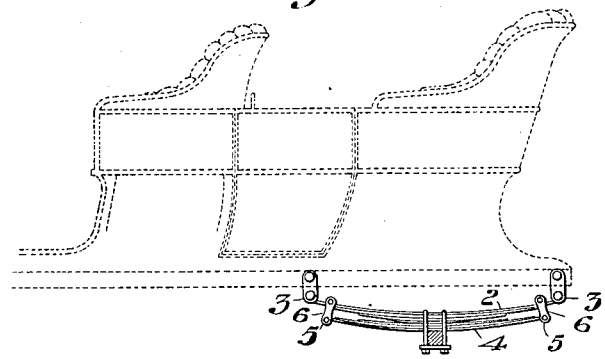
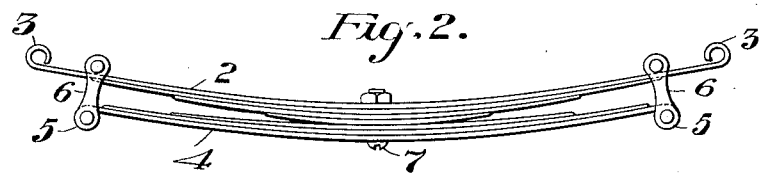
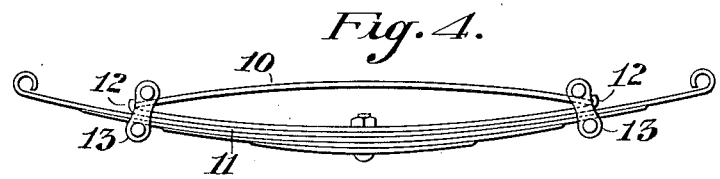
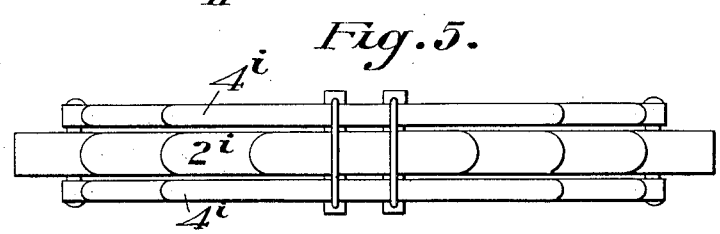
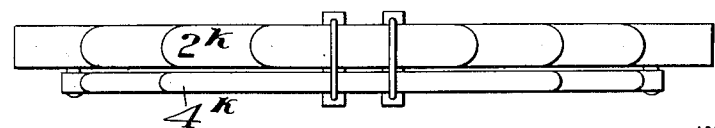

WILLIAM H. SON, OF WILKES-BARRE, PENNSYLVANIA.

SHOCK-ABSORBING APPARATUS.

No. 912,749.　　　Specification of Letters Patent.　　　Patented Feb. 16, 1909.

Application filed March 30, 1906. Serial No. 308,947.

*To all whom it may concern:*

Be it known that I, WILLIAM H. SON, of Wilkes-Barre, Luzerne county, Pennsylvania, have invented a new and useful Shock-Absorbing Apparatus, of which the following is a full, clear, and exact description, reference being had to the accompanying drawings, forming part of this specification, in which,—

Figure 1 is a front elevation of a leaf spring constructed in accordance with my invention, the body of an automobile being shown in dotted lines to indicate the mode of mounting the spring on the axle and the body on the spring; Fig. 2 is a detail view on an enlarged scale showing the spring of Fig. 1; Figs. 3 and 4 are views similar to Fig. 2 showing other forms of my invention; and Figs. 5 and 6 are top plan views showing further forms of the invention.

The object of my invention is to provide means for absorbing or cushioning the recoil of springs, particularly vehicle springs, such as those used on automobiles, wagons, etc.

It is a well-known fact that springs which are designed to carry a certain load act more efficiently when carrying a full load than when under the burden of only a partial load. To obviate this difficulty, I have provided a leaf spring or springs, whereby the opposing force which counteracts or absorbs the recoil of the spring or springs may be arranged to exert a downward force or pressure in a direction opposite to that of the main springs on their recoil when the springs are at rest or in their normal position. The added leaf spring or springs may be arranged to give any desired amount of downward pressure. By this arrangement the main spring is gradually relieved of the load which it carries through the pressure of the supplemental spring during its downward movement, and the supplemental leaf spring or springs begin to resist the recoil movement of the main springs before they have returned to their normal position, and the resistance offered constantly increases until the recoil is entirely absorbed, and this I am able to accomplish without any substantial increase in weight. With the opposing pressure obtained by my invention, the supplemental spring assists in the compression of the main spring until the main spring has been compressed to a certain point, and when the weight of the compression is removed, the supplemental spring offers a gradually increasing resistance and opposing force which assists the main spring in absorbing the recoil action and dampens or cushions the recoil in an effective and efficient manner without subjecting the main spring to any undue strain.

In the drawings, referring to the form of Figs. 1 and 2, 2 represents the main spring which I have shown as of the ordinary variety having a series of leaves of different lengths, the longer leaf having the eyes 3, 3 at its ends. In this form 4 represents my supplemental spring which in this case is placed below the main spring, and also consisting of a series of leaves of different lengths, the longer leaf having end eyes 5, 5. The supplemental spring 4 is provided with loop or link connections 6 which take around the end portions of the main spring, and exert a downward pull thereon. I have shown the leaves of both sets of springs as connected at the center by the bolt 7.

In Fig. 1, I show one manner of employing the spring of Fig. 2, the automobile body being indicated in dotted lines. In this case, when the automobile is driven over a portion of the road which causes a downward movement of the body, the ends of the main spring will be depressed and after the main spring has passed downward until the supplemental springs 4 cease to exert a downward pull thereon, the further depression of the main spring will force the supplemental spring 4 downward through the links 6, and the supplemental spring will assist the main spring in carrying the load. On the upward movement of the main spring, the supplemental spring will follow it until a point is reached where the supplemental spring begins to be compressed in the opposite direction, from which point upward it will continue to offer a constantly resisting force which assists the main spring in absorbing or cushioning the recoil. This not only makes the vehicle more easy riding, but prevents breaking of springs and reduces shocks and jars on the vehicle.

In Fig. 3, I show a form similar to that of Figs. 1 and 2, except that a supplemental leaf 9 is placed on the top of the leaves of the main spring, this leaf being under tension when drawn to place, and assisting the other supplemental spring leaves 4 in cushioning the recoil. Parts similar to Fig. 2 are designated by a similar number with the letter "c" applied.

In Fig. 4, I show the auxiliary spring as consisting of two oppositely bowed springs 10 and 11. One of these springs may have upwardly bent ends 12, 12, inclosing the ends of the other leaf, and the supplemental spring can be secured to the main spring by links such as shown at 13 or by hinges, rivets or other devices.

The supplemental spring or springs may also be placed at the side or sides of the main spring member or members; thus in Fig. 5, $2^i$ represents the main spring, while $4^i$ are the supplemental springs placed on opposite sides of the main spring and connected thereto in such a way as to exert downward pressure through at least a part of the return stroke of the main spring.

In Fig. 6, I show a form similar to that of Fig. 5, except that the main spring $2^k$ is provided with only a single supplemental spring $4^k$ which exerts the downward or opposing pressure through a part or all of the recoil stroke of the main spring.

The advantages of my invention will be apparent to those skilled in the art. The sharp recoils of leaf springs on vehicles are prevented and dampened down in a cheap, simple and efficient manner, and the main spring is relieved from excessive recoil strains which are likely to break or injure it. The spring is provided with a certain load in its normal or neutral position, from which it is gradually relieved as it is compressed in its downward movement, and the opposing spring force which assists in absorbing the recoil shock is continuous through either all of the upward stroke or through that portion thereof which subjects the main spring to the greatest strain, according to the character of the auxiliary spring and its connections.

Changes may be made in the form and arrangement of the main and supplemental springs without departing from my invention.

I claim:—

1. A vehicle spring comprising a normally active main spring, a supplemental spring, and means connecting the springs whereby the supplemental spring normally exerts a downward tension on the main spring when the vehicle is unloaded to resist recoil of the main spring substantially as described.

2. A vehicle spring comprising a normally active main leaf spring, a supplemental leaf spring, and means connecting the ends of the supplemental leaf spring to the main spring whereby the supplemental spring normally exerts a downward tension on the main spring when the vehicle is unloaded substantially as described.

3. A vehicle spring comprising a normally active main leaf spring, a supplemental leaf spring, and means connecting the ends of the supplemental spring to the respective end portions of the main spring for normally exerting a downward tension on the main spring when the vehicle is unloaded to resist the recoil of the main spring, the connection permitting and the springs having a relation whereby the supplemental spring is capable of coming successively to a condition of inaction and then to a condition of supplementing the supporting action of the main spring substantially as described.

4. The combination with a main spring of the leaf or layer type, of a supplemental double-acting spring also of the leaf or layer type, said supplemental spring being shorter than the main spring and secured thereto at the center with its spaced apart ends connected to the main spring by loose links, the supplemental spring imparting an initial load to the main spring and reducing its load during the downward movement of the main spring, but assisting the main spring beyond a certain downward movement, and opposing the upwardly recoil movement of the main spring; substantially as described.

5. A vehicle spring comprising a main spring normally under tension by the weight of the unloaded vehicle, and a supplemental spring normally exerting a downward tension on the main spring when the vehicle is unloaded to resist recoil of the main spring, substantially as described.

6. A vehicle spring comprising a main spring normally under tension by the weight of the unloaded vehicle, and a supplemental spring normally exerting a downward tension on the main spring when the vehicle is unloaded to resist recoil of the main spring and capable of coming successively to a condition of inaction and then to a condition of supplementing the supporting action of the main spring, substantially as described.

7. A vehicle spring comprising a main leaf spring having its ends connected to a vehicle and normally under tension by the weight of the unloaded vehicle, and a supplemental leaf spring having its ends connected directly to and normally exerting a downward tension upon the main spring when the vehicle is unloaded to resist recoil of the main spring, substantially as described.

8. A vehicle spring comprising a main leaf spring having its ends connected to a vehicle and normally under tension by the weight of the unloaded vehicle, and a supplemental leaf spring having its ends connected directly to the main spring and normally exerting a downward tension on the main spring when the vehicle is unloaded to resist recoil of the main spring and capable of coming successively to a condition of inaction and then to a condition of supplementing the main spring, substantially as described.

9. A vehicle spring comprising a main bowed leaf spring having its convexed side downward with its ends connected to a vehicle and normally under tension by the weight of the unloaded vehicle, and a supplemental bowed leaf spring beneath the main spring with its convex side downward and its ends connected directly to the main spring and normally exerting a downward tension thereon when the vehicle is unloaded to resist recoil of the main spring, substantially as described.

In testimony whereof, I have hereunto set my hand.

WILLIAM H. SON.

Witnesses:
E. J. ROTH,
JOHN W. SON, Jr.